United States Patent [19]

Iida

[11] 4,339,805
[45] Jul. 13, 1982

[54] INFORMATION RECORDING SYSTEM

[75] Inventor: Kazuhiko Iida, Yokohama, Japan

[73] Assignee: Tokyo Shibaura Denki Kabushiki Kaisha, Kawasaki, Japan

[21] Appl. No.: 74,893

[22] Filed: Sep. 12, 1979

[30] Foreign Application Priority Data

Sep. 18, 1978 [JP] Japan .................. 53-114423

[51] Int. Cl.³ .................. G06F 3/12; G06K 15/02; G06K 15/14
[52] U.S. Cl. .................. 364/900; 346/158
[58] Field of Search .......... 364/518, 200 MS File, 364/900 MS File; 178/23 R

[56] References Cited

U.S. PATENT DOCUMENTS

| | | | |
|---|---|---|---|
| 3,898,627 | 8/1975 | Hooker et al. | 364/900 |
| 3,909,626 | 9/1975 | Balasubramanian et al. | 364/900 |
| 4,000,486 | 12/1976 | Schomburg | 364/200 |
| 4,024,506 | 5/1977 | Spargaren | 364/900 |
| 4,031,519 | 6/1977 | Findley | 364/900 |

*Primary Examiner*—Joseph M. Thesz
*Assistant Examiner*—Eddie P. Chan
*Attorney, Agent, or Firm*—Cushman, Darby & Cushman

[57] ABSTRACT

An information recording system is provided with a page buffer for storing one page information of those pieces of information supplied from an exterior information supplier. The information stored in the page buffer is read out character by character and the read-out information is latched in a character selection latch circuit capable of storing one character. The row information of a character arranged in a dot matrix corresponding to the character read out is latched in a row selection latch circuit. The information produced from said character selection latch circuit and the row selection latch circuit are supplied to a character generator. Upon receipt of the information, the character generator produces the given dot information in parallel. The dot information are supplied to a shift-register where those are converted into a serial form of information.

1 Claim, 6 Drawing Figures

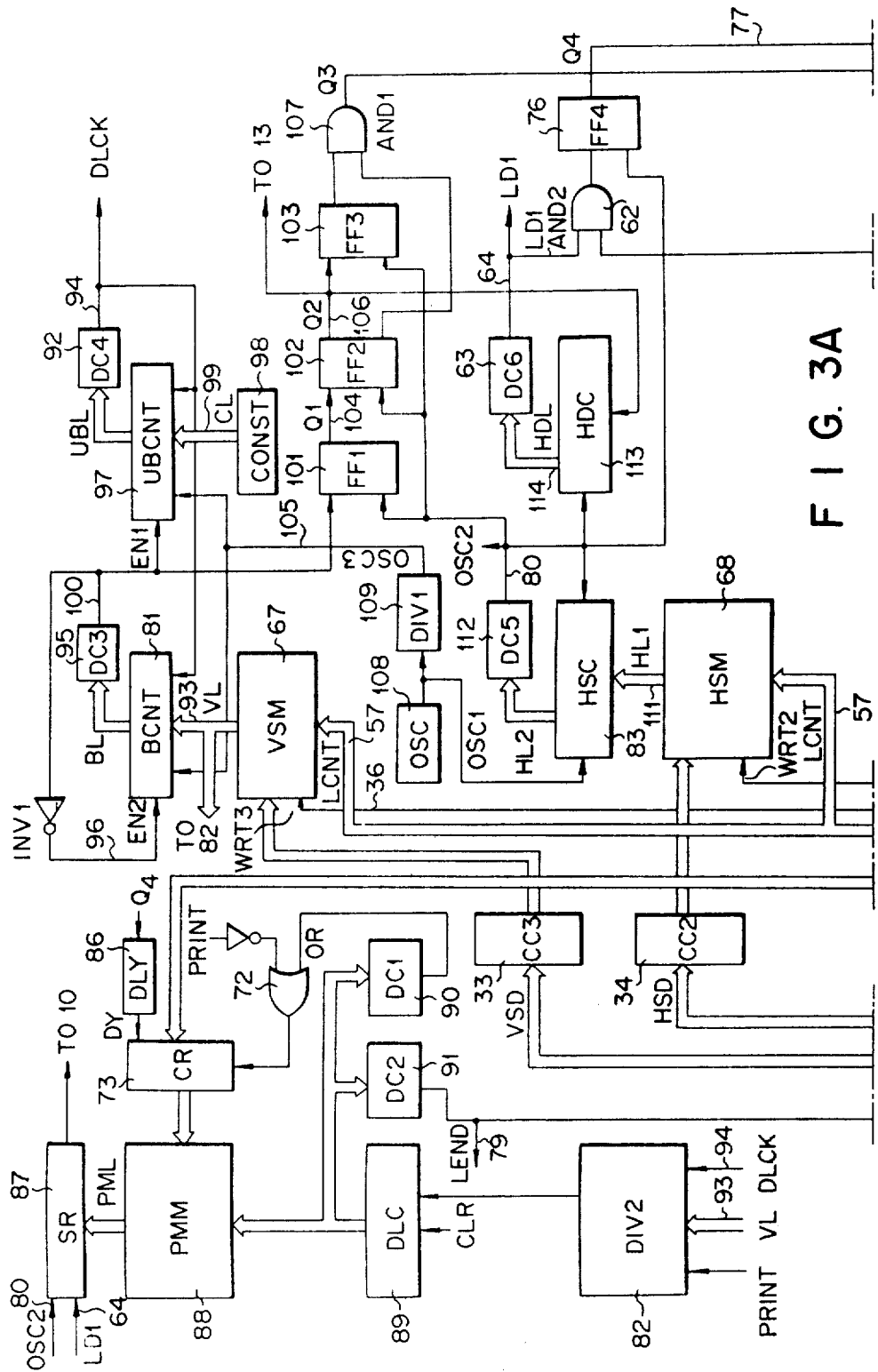
F I G. 3A

INFORMATION RECORDING SYSTEM

BACKGROUND OF THE INVENTION

The invention relates to an information recording system and, more particularly, to the one with an optical fiber tube for recording electrophotographical information.

In recent years, printing systems coupled with an information supplier such as a central processing unit are put into practice and widely used in line printers or serial printers. In the printing system, information transmitted from an information supplier, for example, a central processing unit (hereinafter referred to as CPU) are stored in a buffer by an amount of one line information, and are printed in line-by-line method in sequence. In this system, the data transfer speed from the CPU to the line buffer is extremely higher than the printing speed of the printer. For this reason, the CPU must wait until the printer completes its one line printing of the information. This leads to poor efficiency of the CPU operation.

To solve this problem, a page buffer memory capable of recording one page information of a recording sheet is used together with a line buffer memory for storing character codes on one line of the memory to be printed. This proposal allows the CPU to transfer the information to be printed to the recording system page by page, thus improving the efficiency of the CPU operation. The data transfer from the page memory to the line buffer requires the control of a main control section. This deteriorates the system operation. Further, the memory elements for the line buffer memory is additionally needed with its related control circuit. Accordingly, the control circuit is complicated.

SUMMARY OF THE INVENTION

Accordingly, an object of the present invention is to provide an information recording system having improved recording speed without the line buffer and with a simple control circuit.

To achieve the above object, there is provided an information recording system comprising: means for recording one line of information by scanning plural times a recording medium in synchronism with a recording clock; interface means for latching the information fed from an exterior information supplier; buffer means for storing the character code information of at least one page supplied from the information supplier through the interface means; first latch means for latching one character information produced from the buffer means; second latch means for latching the row information of a character expressed in a dot matrix corresponding to the character code produced from the buffer means; character signal generating means for producing the dot information expressed by given binary codes on the basis of the character code information derived from the first latch means and the row information derived from the second latch means; parallel-serial converting means for converting the parallel dot information produced in parallel from the character generating means into the serial dot information; main control means for controlling the interface means, the buffer means, the first and second latch means, and the parallel to serial converting means; and pulse generating means for supplying a synchronizing signal to the main control means and the parallel to serial converting means.

In the information recording system according to the invention, only the page buffer is used and the CPU supplies the information of one page to the page buffer. The main control reads out character by character the information character from the page buffer in the direct memory access manner (DMA) and sets the read out data in the character selection latch circuit.

Other objects and features of the invention will be apparent from the following description taken in connection with the accompanying drawings, in which:

BRIEF DESCRIPTION OF THE DRAWINGS

FIGS. 3A and 3B cooperate to form a circuit diagram of the information recording system shown in FIG. 1;

DETAILED DESCRIPTION OF THE PREFERRED EMBODIMENT

Figure 1:
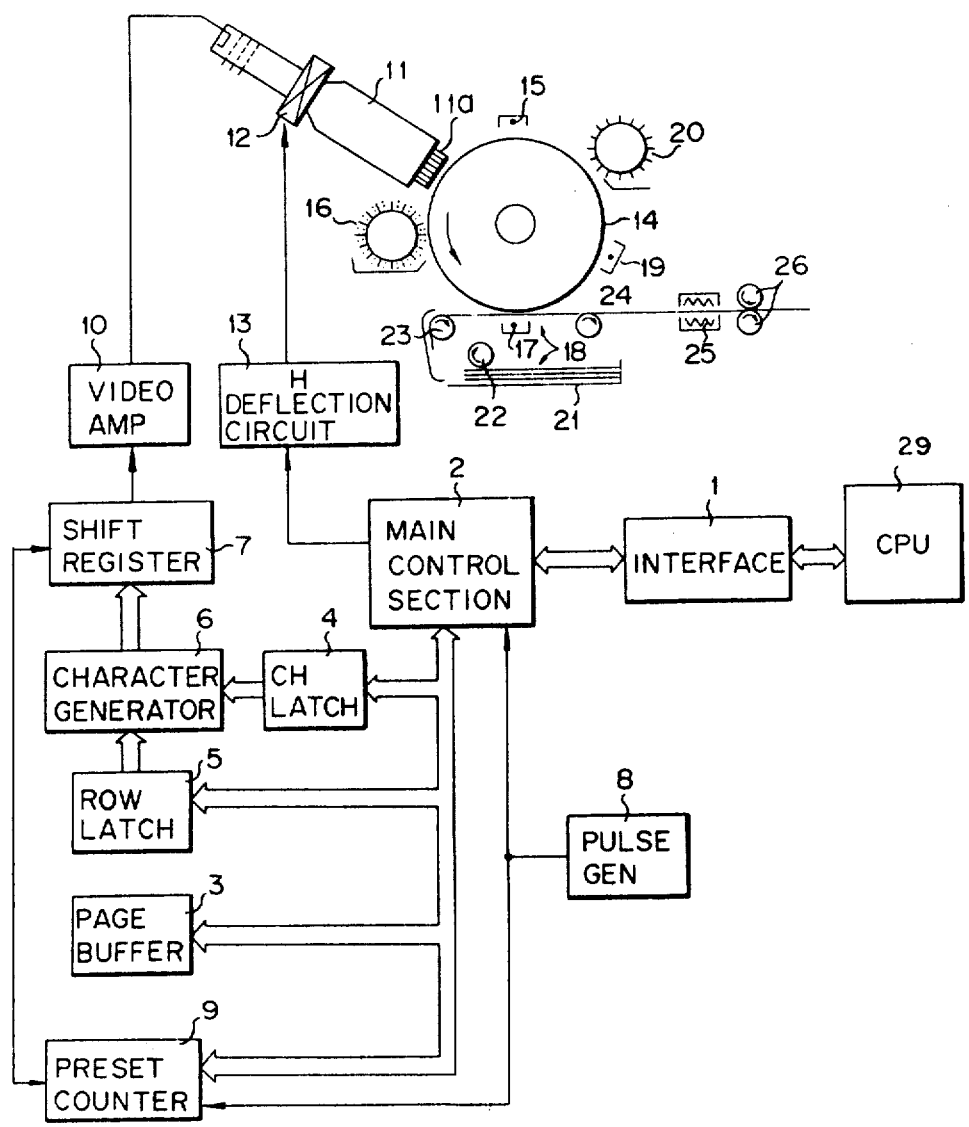
FIG. 1 shows a system block diagram of an overall information recording system according to the invention.

An information recording system according to the present invention will first be described with reference to FIG. 1 illustrating, by way of block and structural forms, the data recording system.

Figure 2:
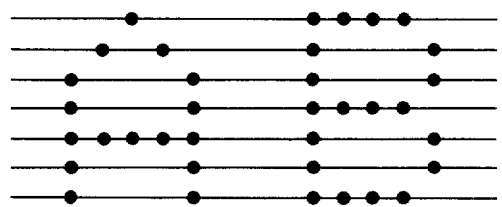
FIG. 2 shows a diagram for illustrating dot patterns of characters in the character generator.

In the figure, an interface 1 intervening between a data supply unit such as CPU 29 and a main control section 2, transfers data to and from the CPU 31 and the main control section 2. As shown, to the main control section 2, a character selecting latch circuit 4, a row latch 5, a page buffer 3, and a preset counter 9 are connected. The main control section 2 is for controlling the whole information recording system. The latch circuit 4 serves as a first memory circuit and the latch circuit 5 as a second memory circuit. The page buffer memory 3 with a memory capacity of recorded data in one page of a recording paper stores character codes corresponding to the data recorded on one page recording paper supplied from the main control section 2. The character codes stored in the page buffer memory are sequentially taken out character by character and then is loaded into the character selection latch circuit 4 with a memory capacity of one character code. The character selection latch circuit 4 stores one character code supplied from the main control section 2 as record character selection information. The row selection latch circuit 5 stores data to select dot information arranged on a proper row of a dot pattern of one character selected by the character selection latch circuit 4. Such dot-data selection information are supplied from the main control section 2. The character selection latch circuit 4 and the row selection latch circuit 5 are coupled with a character signal generator 6. The character signal generator 6 receives the character code signal from the character latch selection circuit 4 and the information stored in the row selection latch circuit 5, and produces dot information of a dot matrix of $5 \times 7$, for example, as shown in FIG. 2. The dot information are outputted in parallel from the character generator 6 and applied to a shift register 7. A pulse generator 8 produces clock pulses to synchronize the operation of the overall system, and supplies them to the main control section 2 and the preset counter 9. The preset counter 9 produces a shift signal under control of the main control section 2 which in turn is applied to the shift register 7. The shift register 7, while being synchronized by the shift signal from the preset counter 9, converts parallel dot information derived from the character signal generator 6 into serial dot information which are transferred bit by bit to a video amplifier 10. The video amplifier 10 amplifies a signal derived from the shift register 7 and applies it as a video signal to a cathode of an optical fiber tube 11. To a deflection coil 12 of the OFT 11, a horizontal deflection synchronous signal produced from the main control section 2 is applied through a horizontal deflection circuit 13.

In the OFT 11, an electron beam produced by a video signal derived from the video amplifier 10 is deflected by the horizontal deflection coil 12 thereby to scan on the fluorescent surface of its face plate 11a. The beam scanning excites the fluorescent material on the face plate 11a to radiate light in the form of a given dot image. The dot image is then introduced onto a photosensitive means, for example, a photosensitive drum 14 disposed close to the face plate 11a. The photosensitive drum 14, rotating in the direction indicated by the arrow drawn thereon, is charged by a electric charge 15, and is exposed to the beam scanning by the OFT 11. Through the exposure, an electrostatic latent image is formed on the surface of the photosensitive drum 14. The drum 14 bearing the electrostatic latent image further rotates to go by a developer 16. The developer 16 developes the electrostatic latent image by using toner to visualize it with attachment of toner thereunto. With further rotation of the drum 14, the developed image reaches a transfer stage of a transfer charger 17 where toner on the latent image is attracted onto a recording medium such as a recording paper 18 charged by the charger 17. After the transfer of the latent image, the photosensitive drum 14 reaches an electric removal stage of an electric remover 19 where charges on the drum 14 are removed by applying a high AC voltage to the remover 19. Further, the electrostatic latent image is erased by illumination of a fluorescent lamp (not shown). A little amount of toner remaining on the surface of the photosensitive drum 14 is cleaned by a cleaner 20 and the photosensitive drum is ready for the next image recording process.

The recording paper is taken out from a cassette 21 by a take-out roller 22 in synchronism with the rotation of the photosensitive drum 14, and is transported to the transfer stage 17 by transporting roller 23. The recording paper 18 intimately contacts with the drum 14 at the charger 17 so that the developed image on the drum 14 is transferred onto the recording paper 18. After emanating from the transfer stage, the recording paper 18 enters a fixing stage designated as a fixing device 25 where the transferred image is fixed, and then is further transported to the output stacker (not shown) by the output roller 26.

Figure 3B:
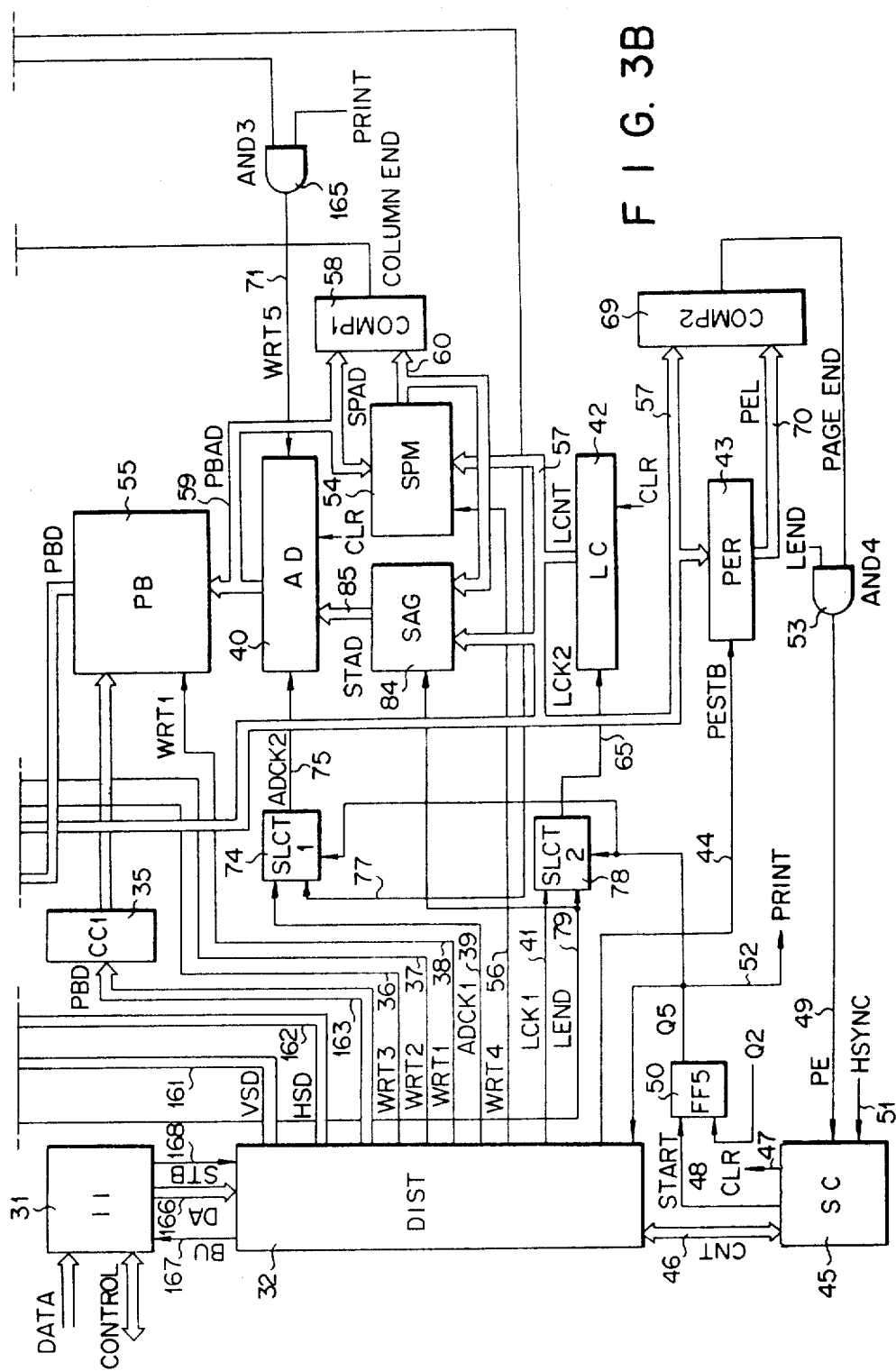

The details of the data recording system conceptionally illustrated in FIG. 1 will be described with reference to FIGS. 3A and 3B. In FIG. 3B, information input section (II) 31 accepts data (ASCII code) transferred from an exterior information supply unit under control of a control signal and applies the information to a distributor (DIST) 32, through a bus (DA) 166 connected to the information input section 31. The information input section 31 is comprised of, for example, a latch circuit to latch one character. The information input section 31 produces a control signal STB 168 for transfer to the distributor 32 while the distributor 32 produces a busy signal (BU) 167 to the information input section (II) 31. The distributor 32, comprising a multiplexer, for example, distributes the information received from the information input section (II) 31 to the respective related circuits. When receiving a character size information, the distributor 32 transfer the vertical size information to a code converter (CC3) 33 shown in FIG. 3A connected to the distributor 32 and transfers the horizontal size information to a code converter (CC2) 34 connected to the distributor 32. When receiving a character code, the distributor 32 transfers it to a code converter (CC1) 35 connected to the distributor 32. At this time, the distributor 32 produces write control signals WRT3 36, WRT2 37, and WRT1 38, in accordance with the input control information inputted thereinto. A control signal ADCK1 39 is outputted from the distributor 32 in order to count up an address counter (AD) 40 after the WRT1 signal 38 is outputted. When receiving a line feed information, the distributor 32 produces a control signal LCK1 41 which in turn is applied to a line counter (LC) 42 through a selector (SLCT2) 78 connected to the distributor 32. Upon receipt of the control signal 41, the line counter (LC) 42 is counted up. When print start information is applied to the distributor 32, the distributor 32 produces a control signal PESTB 44 to store the end line number into a page end register (PER) 43. When information representing the number of printing material to be printed is applied to the distributor 32, the distributor 32 transfers a control signal CNT 46 for designating the number of the printing material to a start controller (SC) 45.

When the information is inputted to the information recording system, the start controller (SC) 45 connected to the distributor 32 produces a clear signal (CLR) 47 to initialize the address counter 40, the line counter 42 and the like and directs the distributor 32 to initiate the information input. When receiving the print start information by the control signal CNT 46, the start controller 45 produces a clear signal (CLR) 47 and a print start signal (START) 48. When receiving a page end signal (PE) 49 through an AND circuit (AND4) 53, the start controller 45 renders the START signal 48 low in level. The start controller 45 is comprised of a decoder and other proper circuit components. A flip-flop (FF5) 50 coupled with the start controller 45 responds to the START signal 48 to produce a PRINT signal 52 in synchronism with a horizontal synchronizing signal (HSYNC) 51 equivalent to the signal $Q_2$ 106. The page end signal 49 is produced from the AND circuit (AND4) 53 when the final row of a dot matrix on the end line is scanned.

A stop address memory (SPM) 54 stores an address signal PBAD from the page buffer 55, which stores the final character codes of the respective lines of the character code stored in the page buffer (PB) 55 into the address of the memory 54 per se indicated by a line count signal (LCNT) 57 every time the distributor 32 applies the write signal 56 into stop address memory 54. At the time of printing, the stop address memory 54 produces a final character code address of the line indicated by the LCNT 57. A comparator (COMP1) 58 compares a page buffer address signal (PBAD) 59 of a character now being printed stored in the page buffer 55 with the final address signal (SPAD) 60 on the line now being printed. When those values are equal to each other, it produces a column end signal to prohibit the FF4 (76) from receiving the LD1 signal by the AND gate (AND2) 62.

The line counter (LC) 42 counts a clock signal (LCK2) produced from the selector (SLCT2) 78 as a clock. The counter 42 which is an up-counter, counts up by the clock signal (LCK1) every time that it receives the line feed instruction. The output of the counter 42 is connected to a vertical size memory (VSM) 67, a horizontal size memory (HSM) 68, the stop address memory (SPM) 54, the start address register (SAG) 84, a comparator (COMP2) 69, and a page end register (PER) 43. In the printing operation, a line end signal (LEND) causes the counter 42 to count up at the end of each line.

When the page end register 43 receives a print start instruction in the data input operation, a control signal (PESTB) 44 derived from the distributor 32 causes the page end register 43 to store the contents of the line counter 42. In other words, the page end register 43 latches the number of rows at the final line. In the printing operation, this value also is outputted to the comparator (COM2) 69 to know the page end. The comparator 69 compares the number of lines (LCNT) 57 currently being printed with the number of the page end line 70. When both are coincident with each other, it reports the page end to the start controller 45. The AND gate (AND3) 165 is used to prevent a write signal (WRT5) from inputting data into the address counter (AD) 40. In the other operation than the printing, the OR gate 72 rests the character register (CR) 73 while, in the printing operation, it resets the character register 73 between lines spaces (a line with a space code printed thereon). The selector (SLCT1) 74 produces the ADCK 1 signal 39 as the ADCK2 signal 75 in the data inputting operation. In the printing operation, it produces an output signal Q4 77 of a flip-flop FF4 as the ADCK2 signal 75. In the data input operation, the selector (SLCT2) 78 produces the LCK1 signal 41 as the LCK2 signal 65 while, in the printing operation, it produces a line end signal (LEND) 79 as the LCK2 signal 65. The AND gate (AND2) 62 prevents further counting up of the address counter 40 of the page buffer 55 when the scanning is performed up to the end of each line. The flip-flop (FF4) 76 retards the LD1 signal 64 by one clock of a reference signal (OSC2) to count the address of the page buffer 55. The vertical size memory (VSM) 67 writes the vertical size information outputted from the code converter (CC3) 33 into the address indicated by the LCNT signal 57 in response to the write signal (WRT3) 36, thereby to record the vertical size of each line. The output of the VSM 67 is supplied to a blanking counter (BCNT) 81 and a divider (DIV2) 82. The horizontal size memory (HSM) 68 writes the horizontal size information of a character produced from the code converter (CC2) 34 into the address indicated by the LCNT signal 57 in response to the write signal (WRT2) thereby to store the horizontal size of each line. In the printing operation, its output is supplied to the horizontal size counter (HSC) 83 to determine a time per dot. The page buffer (PB) 55 writes the character code outputted from the code converter (CC1) 35 into the address indicated by the address counter (AD) 40 in response to the write signal (WRT1). In the printing operation, it produces the contents of the address indicated by the address counter 40 into the character register (CR) 73. The page buffer 55 is capable of accommodating data of one or more page. The length of one line is variable. The code converter (CC1) 35 converts the character code (ASCII code) of PBD into the internal code of a pattern matrix memory (PMM). The code converter (CC2) 34 converts the character size information of HSD 162 into the internal code corresponding to HSM 68. The code converter (CC3) 33 converts the character size information of VSD 161 into the internal code corresponding to VSM 67.

The address counter 40, which is an up-counter of the preset type, counts up, in writing the character code into the page buffer 55, by a control signal ADCK1 39 outputted after the write signal (WRT1) 38 is outputted. In the printing operation, the start address of each line from the SAG 84 is preset in the address counter 40 in synchronism with the write signal WRT5. The address counter 40 with the preset start address is counted up by a signal Q4 produced at the end of each character. The production of the signal Q4 stops at the time point that the end character of each line is printed. Accordingly, no further counting-up of the address counter (AD) 40 is performed. The start address register (SAG) 84 is a register with a capacity enough to store 1 plus a value of a SPAD signal 60 indicating the address of end character on the preceding line of those characters stored in the page buffer 55, and to store one address. The character register (CR) 73, connected to the page buffer 55, latches one character code produced from the page buffer 55. The decoder (DC1) 90 receives an output signal from the dot line counter (DLC) 89 and produces decoded information during a line space to clear the character register (CR) 73. The decoder (DC2) 91 receives an output signal from the dot line counter (DLC) 89 and produces decoded information at an instant that the printing of one line in a text is completed. The divider 82 determines the number of scannings for dots arranged on one row of a dot pattern depending on the contents of an output signal (VL) from the vertical size memory. The blanking counter (BCNT) 81, which is a preset type down-counter, presets the contents of the signal (VL) when an output signal from the decoder (DC4) 92 is logical "1", and determines the blanking time when an output signal 96 from a decoder 95 is logical "1". An unblanking counter (UBCNT) 97 is a preset type down-counter and in operation presets an output signal (CL) 99 from the constant circuit 98 when the signal DLCK 94 is logical "1", and determines the scanning time when an output signal (EN1) 100 from the decoder 95 is logical "1". The decoder (DC3) 95 produces a signal of logical "1" when the contents of the blanking counter 81 is zero. A decoder (DC4) 92 produces logical "1" when the contents of the unblanking counter 97 is zero. The constant circuit (CONST) 98 produces a fixed value determining a fixed time.

A flip-flop (FF1) 101 synchronizes the signal (EN1) 100 (original signal of the horizontal synchronizing signal) with the reference signal OSC2 80. A flip-flop (FF2) 102 is used to delay an output signal Q1 from the FF1 101 by one clock of the reference signal OSC2 80 to form a horizontal synchronizing signal. A flip-flop (FF3) 103 delays by one clock an output signal (Q2) 106 from the flip-flop (FF2) 102. The AND circuit (AND1) 107 produces one pulse of one clock of the reference signal OSC2 80 continuous from the trailing edge of the horizontal synchronizing signal (HSYNC). An oscillator (OSC) 108 is connected with a divider (DIV1) 109 and horizontal size counter (HSC) 83. The divider 108 frequency-divides an output signal (OSC1) from the oscillator 108 to produce a clock signal (OSC3) 105.

The horizontal size counter (HSC) 83, which is a preset type down-counter, presets an output signal (HL1) 111 of the horizontal size memory (HSM) when the reference signal (OSC2) 80 is logical "1" and determines a time permitting the dot of the character pattern. The decoder (DC5) 112 produces logical "1" when the output signal (HL2) from the horizontal size counter (HSC) 83 is zero. A horizontal dot counter (HDC) 113 is a counter to determine the number of dots (including a character space) in one character horizontal direction, and is cleared during the blanking by a signal Q2 106. The horizontal dot counter uses the reference signal OSC2 80 as a basic clock (up-counter). The decoder (DC6) 63 produces a signal of logical "1" as an output signal LD1 64 when the HDL 114 produced from the horizontal dot counter (HDC) 113 reaches a predetermined maximum value, and counts up the address of the page buffer 55.

In FIGS. 3A and 3B, the information input circuit 31 corresponds to the interface circuit 1 shown in FIG. 1; the oscillator (OSC) 108 to the pulse generator 8; the horizontal size counter (HSC) 83 to the preset counter 9; the page buffer memory 55 to the page buffer 3; the dot line counter (DLC) 89 to the row selecting latch circuit 5; the character register (CR) 73 to the character selecting latch circuit 4; the pattern matrix memory (PMM) 88 to the character generator 6; the shift register (SR) 87 to the shift register 7. The address counter (AD) 40, the start address register (SAG) 84, the stop address memory (SPM) 54, and the comparator (COMP1) 58 cooperate to form a direct memory access (DMA). The remaining portion in the circuit shown in FIGS. 3A and 3B corresponds to the main control section 2 in FIG. 1.

Figure 4:
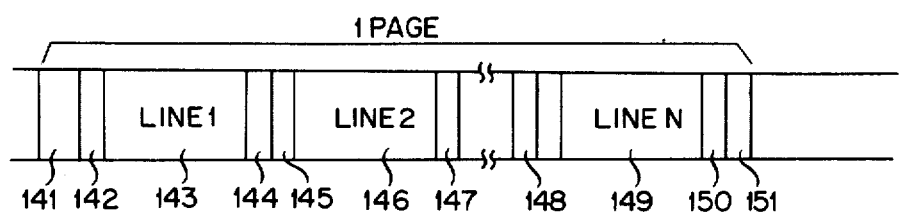
FIG. 4 shows a format of the information including the control and data information supplied to the information input section shown in FIG. 3.

Turning now to FIG. 4, there is shown a format of the information of one page supplied from the CPU. In the figure, a field 141 control information is the information to designate the number of copies, for example; a field 142 the size information on the first line (including vertical and horizontal information); a field 143 the information of the character codes on the first line; a field 144 line feed information. Similarly, fields 145 and 148 the size information on the second line and the Nth line (including the vertical and horizontal information). Fields 146 and 149 are character code information on the second and the Nth lines. Fields 147 and 150 are line feed information on the second and the Nth lines. A field 151 is control information of the printing start.

The symbols used in the drawings are listed below.

Register
 SR—Shift register
 CR—Character register
 SAG—Start address register
 PER—Page end register
Memory
 PMM—Pattern matrix memory
 VSM—Vertical size memory
 HSM—Horizontal size memory
 SPM—Stop address memory
Counter
 DLC—Dot line counter
 BCNT—Blanking counter
 UBCNT—Unblanking counter
 HSC—Horizontal size counter
 HDC—Horizontal dot counter
 AD—Address counter
 LC—Line counter
Decoder
 DC1—Decoder 1
 DC2—Decoder 2
 DC3—Decoder 3
 DC4—Decoder 4
 DC5—Decoder 5
 DC6—Decoder 6
Divider
 DIV1—Divider 1
 DIV2—Divider 2
Flip-Flop
 FF1—Flip-flop 1
 FF2—Flip-flop 2
 FF3—Flip-flop 3
 FF4—Flip-flop 4
 FF5—Flip-flop 5
Gate
 AND1—AND gate 1
 AND2—AND gate 2
 AND3—AND gate 3
 AND4—AND gate 4
 OR—OR gate
Converter
 CC1—Code converter 1
 CC2—Code converter 2
 CC3—Code converter 3
Comparator
 COMP1—Comparator 1
 COMP2—Comparator 2
Selector
 SLCT1—Selector 1
 SLCT2—Selector 2
Others
 II—Information input circuit
 DIST—Distributor
 SC—Start Controller
 DLY—Delay circuit
 CONST—Constant circuit
 OSC—Oscillator
 PB—Page buffer The operation of the information recording system mentioned above will be described with reference to FIGS. 3A and 3B. Let us first consider the input of information. When the address counter 40 and the line counter 42 are cleared, data is received by the information input circuit 31. The data received enters through the bus DA to the distributor 32. The first data is the control information to designate the number of copies, for example, and therefore is transferred to the start controller 45. Then, when the vertical size information of a character is inputted, the distributor 32 produces the vertical size information for transfer to the code converter (CC3) 33. The code converter 33-code converts the vertical size and the code-converted one is written into the first address (corresponding to the first line) of the vertical size memory 67 by the write signal 36. Following this, when the horizontal size information is inputted, the distributor 34 transfers the horizontal size information to the code converter 34. The code converter 34 code-converts the horizontal size information and the code-converted one is written into the first address (corresponding to the first line) of the horizontal size memory 68 by the write signal (WRT2) 37. Then, when the first character code on the first line is inputted, the distributor 32 transfers the character code to the code converter (CC1) 35. The code converter (CC1) 35 code-converts the character code (ASCII code) into a given binary code, for example.

The character code which is code-converted is written into the first address of the page buffer 55 by the write signal (WRT1) 38. After this, the address counter 40 is counted up by +1 in response to the address clock signal (ADCK2) 75. Succeedingly, when the second character on the first line is inputted, it is stored in the second address of the page buffer 55 and the contents of the address counter 40 is simultaneously incremented by one count. The operation continues until the line feed information is inputted.

When the line feed information is inputted, the write signal (WRT4) 56 is outputted and the address signal (PBAD) 59 of the page buffer 55 storing the final character code on the first line is stored in the first address (corresponding to the first line) of the stop address memory 54. Then, the distributor 32 writes code "0" representing a blank (space character) in the matrix of the pattern matrix memory 88 into the page buffer 55 to count up the address counter 40 by one count for preparation for the next line storage. Accordingly, the blank character is always written into the address of the page buffer 55 storing the final character. The line counter 42 is counted up by the clock signal LCK1 (indicating a line 2).

Then, when the character size information on the second line is inputted, the vertical size information of the character is code-converted and written into the address (second address) of the vertical size memory (VSM) 67 indicated by the LCNT. The horizontal size information is code-converted and written into the address (the second address) of the horizontal size memory 68 indicated by the LCNT. Then the character information is code-converted and written into the location of the page buffer 55 indicated by the address counter 40 in response to the write signal 38. And the address counter 40 is counted up. The 2nd, 3rd, 4th, ... nth character code information on the second line will be performed in the similar way.

Then, when the line feed information is inputted, the write signal (WRT4) 56 is outputted as in the case of the first line, and the address signal 59 of the page buffer 55 storing the final character on the second line is stored in the second address (corresponding to the second line) of the stop address memory 54. Then, the distributor 32 writes code "0" (space character) into the page buffer 55 to count up the address counter 40. Further, the line counter 42 is counted up. Similarly, the information on line 3, line 4, ... line n are stored and the line feed information 150 on the final line is inputted and then the print start information 151 is inputted. As a result, the count-up of the line counter 42 is not performed and the distributor 32 produces the control signal (PESTB) 44, and the page end register 43 stores the number of the total lines in a text. Additionally, the distributor 32 transfers the print start control signal 46 to the start controller 45. The start controller 45 produces the clear signal (CLR) 47 to reset the respective counter to produce the START signal 48, resulting in start of the printing operation.

When the START signal is outputted, the control signal PRINT is distributed to the respective circuits, in synchronism with the horizontal synchronizing signal HSYNC. Upon the signal distribution, the selector 74 and the selector 78 select the output signal Q4 and the line end signal 79. The dot line counter 89 is cleared so that the first row of each character is addressed. Since the address counter 40 is also cleared, the first character on the first line is applied from the page buffer 55 to the character register (CR) 73. At this time, the contents of the character register (CR) 73 are already cleared. The output signal Q4 77 is outputted at the start of one character and is applied to the input of the delay circuit 86. Then, the circuit 86 produces a delay signal DY (corresponding to two or three dots). When the delay signal DY is produced, the character register 73 latches the first character code on the first line produced from the page buffer 55. This code becomes the address information of the pattern matrix memory 88 to make an access to the memory 88.

At this time, the output signal PML from the pattern matrix memory 88 includes the dot information on the first row of the first character on the first line. When the signal 114 produced from the horizontal dot counter 113 becomes largest, the dot information are inputted into the shift register 87 by the LD1 signal 64 of logical "1" (the LD1 signal is produced at the final dot, i.e. the 5th dot in the case of a dot matrix of 5×7). At the same time, the dot information are shited dot by dot by the signal OSC2 80 produced from the decoder 112. After the signal LD1 64 is outputted, the signal Q4 77 is produced after one dot and the address counter 40 is counted up, with the result that the page buffer 55 produces the character code information (PBD) of the second character of the first line. Then, the output signal Q4 77 from the flip-flop 76 is applied to the delay circuit 86 and the DLY 86 produces a delay signal DY. The contents of the PBD (the second character code on the first line) are latched in the character register 73. The dot information of the first row of the first character on the first line are all outputted in series so that the signal 64 is inputted to the shift register 87. As a result, the dot information on the first row of the second character on the first line are latched in the shift register 87 and are outputted in series in synchronism with the signal OSC2 80. In this way, the dot information are outputted as the first row video signals of the signals to be printed on the first line, and when the final character on the first line is printed, the output signal PBAD 59 of the address counter 40 is coincident with the output signal SPAD 60 from the stop address memory 54, so that the comparator (COMP1) 58 produces a column end signal to stop the count-up of the address counter 40. As a result, no video signal is produced from the shift register 87.

Under the blanking (no video signal is produced), the scanning progresses to reach the scanning end (the end of HSYNC). At this time, the output signal (DLCK) 94 from the decoder 92 is outputted and is inputted to the dot line counter 89 through the divider 82 (in this case, the value of the DLCK is assumed to go to the dot line counter 89 without being changed). Upon this, the dot line counter 89 is counted up by one count to access to the dot information on the second row of the pattern matrix memory 88. Further, when the horizontal synchronizing signal (HSYNC) falls, the write signal WRT5 is outputted so that the address counter (AD) 40 presets the contents of the start address register 84 therein. In this case, however, since the contents of the line counter 42 is cleared, the contents of the start address register 84 is also cleared so that the address counter 40 becomes again in clear condition. As a result, the column end signal also is released, so that the scanning of the second row initiates at the leading edge of the horizontal synchronizing signal (HSYNC) thereby to effect the printing of all the dots on the second row of those dots of the characters to be printed on the first line, as in the case of the scanning of the first row.

In a similar way, the scannings of the third and fourth rows are performed and, at the end of the Nth row scanning, the decoder (DC1) produces a signal to clear the character register 73 during the line space (from the instant that the signal of DC1 90 until the signal DC2 91 is outputted) and to inhibit the video signal. When the character register 73 is cleared, the dot information of the pattern matrix are all "0". Succeedingly, when the line space ends, the line end signal LEND 79 is produced from the decoder DC2 91, so that the contents of the line counter 42 is counted up at the trailing edge of the output signal so as to print the second line. At this time, the start address register 84 increments by one the address of the page buffer 55 storing the final character on the first line and latches it. Therefore, the address incremented indicates the address of the page buffer 55 storing the first character code on the second line. As in the case of the first line printing, the print of the second line is performed. Similarly, the 3rd, 4th, . . . nth lines are printed succeedingly. When the last line is printed, the page end register 43 is coincident with the line counter 42, and the comparator 69 produces a page end signal. Further, when the last row of the last line is scanned, the page end signal is outputted through the AND circuit (AND4) 53 to the start controller 45. As a result, the start controller 45 renders the START signal logical "low" to complete the print of one page.

Figure 5:
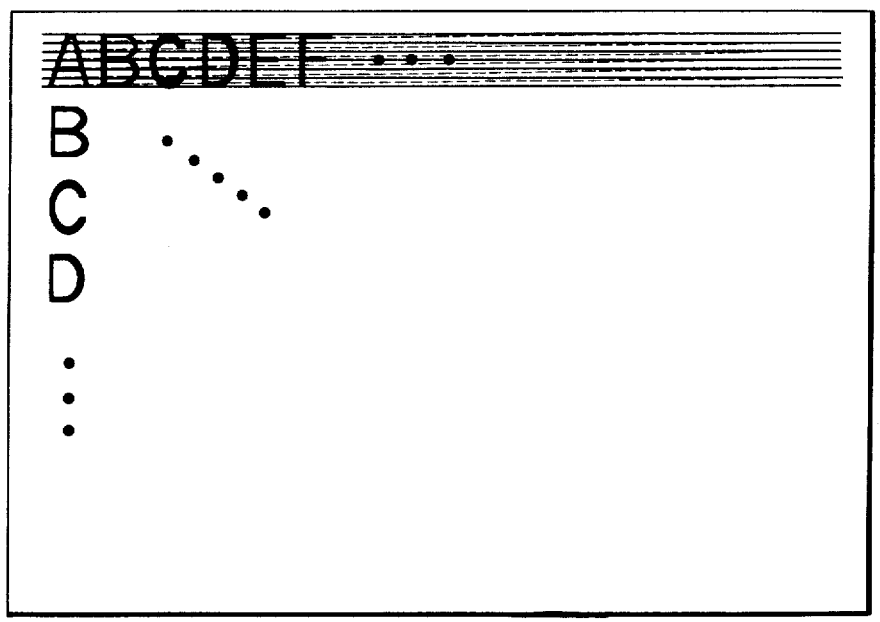
FIG. 5 shows a recording state of data.

An example of the recording state obtained in this manner is shown in FIG. 5.

Since the page buffer memory 55 with one page memory capacity is used, the same contents may be recorded on a plurality of recording papers 18 by repeating the operation as mentioned above without changing the contents of the page buffer memory 55.

The above-mentioned embodiment is the application of the invention to an electrophotographic recording system with an optical fiber tube. It is evident that the present invention is applicable for an electrophotographic recording system with laser or needle electrodes or the recording system of the ink-jet type or the impact type.

What is claimed is:

1. An information recording system for recording one line of characters at a time in dot pattern, through a plurality of horizontal scannings, comprising:

pulse generating means;

interface means for latching character code information, horizontal and vertical character size information and deflection control information, all supplied from an external information supplying device;

buffer means connected to said interface means for storing at least said character code information which is needed to reproduce one page;

latch means connected to said buffer means for latching character code information read from said buffer means;

preset counter means connected to said interface means and said pulse generating means for (a) receiving information supplied via said external information supplying device and said interface means, which represents the horizontal size of characters to be recorded and (b) determining dot intervals in the horizontal direction in accordance with said horizontal character size information and with the pulse signals from said pulse generating means;

vertical size memory means connected to said interface means for storing information, supplied from said interface means, which represents the vertical size of characters to be recorded;

a direct memory access unit connected to said interface means, buffer means, preset counter means and vertical size memory means for transferring the character code information from said buffer means to said latch means;

first counter means connected to said vertical size memory means for measuring a flyback period and determining a time interval between adjacent horizontal scannings according to the vertical size information supplied from said vertical size memory means;

second counter means connected to said first counter means for providing row information determining a dot pattern, in accordance with an output value of said first counter means;

character signal generating means connected to said second counter means for receiving row information therefrom and said latch means for receiving character information therefrom, said character signal generating means for generating parallel character dot information comprising binary codes representing rows of characters to be printed;

parallel-serial converting means connected to said character signal generating means for converting the parallel dot information provided by said character signal generating means into serial dot information;

electronic printer means for printing dot information supplied by said parallel-serial converting means, said printing means having an optical fiber tube and a rotatable photosensitive drum and being adapted to control vertical deflection as a function of the speed at which the photosensitive drum rotates;

a horizontal deflection circuit connected to said electronic printer means for supplying horizontal synchronization signals to said electronic printer means so that characters to be printed by said printer means may be deflected in the horizontal direction; and main control means connected to said pulse generating means, interface means, latch means, first counter means, second counter means, buffer means, preset counter means and horizontal deflection circuit for controlling information transfer among said interface means, buffer means, latch means, first and second counter means and horizontal deflection circuit in response to the pulse signals from said pulse generating means.

* * * * *